(12) United States Patent
Fukushima

(10) Patent No.: US 7,251,304 B2
(45) Date of Patent: Jul. 31, 2007

(54) BIT SYNCHRONIZING CIRCUIT CONFIGURED TO OBVIATE ERRORS FROM META-STABILITY

(75) Inventor: Masanobu Fukushima, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 731 days.

(21) Appl. No.: 10/391,702

(22) Filed: Mar. 19, 2003

(65) Prior Publication Data

US 2003/0223522 A1    Dec. 4, 2003

(30) Foreign Application Priority Data

Mar. 22, 2002  (JP)  ............................. 2002-081437

(51) Int. Cl.
  *H04L 7/00*  (2006.01)
(52) U.S. Cl. ..................................... 375/354
(58) Field of Classification Search ................ 375/350, 375/362, 371, 354, 355, 357, 226, 224, 307, 375/377; 377/78, 77, 64, 104; 327/152, 327/144, 153, 161, 141, 100; 360/51, 39
  See application file for complete search history.

(56) References Cited

U.S. PATENT DOCUMENTS

| 4,922,441 | A | 5/1990 | Tsukagoshi et al. |
| 5,161,228 | A | 11/1992 | Yasui et al. |
| 5,341,468 | A | 8/1994 | Shiraishi et al. |
| 5,396,585 | A | 3/1995 | Fujii et al. |
| 5,448,690 | A | 9/1995 | Shiraishi et al. |
| 5,459,822 | A | 10/1995 | Izawa et al. |
| 5,551,019 | A | 8/1996 | Izawa et al. |
| 5,692,163 | A | 11/1997 | Fukushima |
| 5,732,204 | A | 3/1998 | Fukushima et al. |
| 5,739,826 | A | 4/1998 | Shiraishi et al. |
| 5,742,801 | A | 4/1998 | Fukushima et al. |
| 6,594,094 | B2 * | 7/2003 | Rae et al. ..................... 360/25 |
| 6,760,389 | B1 * | 7/2004 | Mukherjee et al. ......... 375/326 |
| 2003/0091136 | A1 | 5/2003 | Sugita |

FOREIGN PATENT DOCUMENTS

| JP | 7-193562 | 7/1995 |
| JP | 8-256137 | 10/1996 |
| JP | 9-36849 | 2/1997 |
| JP | 10-247903 | 9/1998 |
| JP | 10-327136 | 12/1998 |
| JP | 2003-218843 | 7/2003 |

* cited by examiner

Primary Examiner—Pankaj Kumar
(74) Attorney, Agent, or Firm—Cooper & Dunham LLP

(57) ABSTRACT

A bit synchronizing circuit that provides highly reliable data transmission at a high speed is provided. The circuit facilitates testing by using a plurality of clock signals that are generated based on a reference clock signal, each of the clock signals having unique phases. The circuit selects one of the clock signals as a writing clock signal that is suitable for a clock signal for synchronizing serial data, based on a synchronous timing signal. The synchronous timing signal is generated based on an edge signal that is generated based on an edge position of serial data. The edge position is determined for a plurality of groups of the clock signals, each group including clock signals chosen every predetermined number of the clock signals.

13 Claims, 14 Drawing Sheets

BIT SYNCHRONIZING CIRCUIT CONFIGURED TO OBVIATE ERRORS FROM META-STABILITY

BACKGROUND OF THE INVENTION

1. Field of the Invention

The present invention generally relates to a bit synchronizing circuit used in high-speed serial communications and a semiconductor device therewith.

2. Description of the Related Art

As widely known, data are generally transmitted and received by using a reference clock of the same frequency in high-speed serial communications, wherein a transmission speed of a transmission side and a reception speed of a receiving side are mutually predetermined. In order that the receiving side correctly receive the data transmitted from the transmission side, both sides need to operate synchronously. Although there is a method of supplying a clock signal for synchronizing with a data signal to the transmission and receiving sides, there are problems, such as signal wave distortion, reflection, interference in a cable, and interference in a board if the method is applied to recent high-speed serial communications at a clock speed of hundreds of MHz or tens of GHz. For this reason, redundant bits are added to the data signal on the transmission side, encoded such that transition of the data signal is secured at a fixed interval, and transmitted, instead of sending the clock signal used for communications apart from the data signal. On the reception side, since the data sent from the transmission side include timing information, the data are usually sampled, and excessive bits are decoded after the sampling.

For example, in the case of data that are NRZ (non-return to zero) encoded on the transmission side, the receiving side is required to generate a synchronous clock signal for data sampling by using a bit synchronizing circuit such that the data are correctly received. Therefore, a clock of a frequency higher than the transmission speed is supplied to the bit synchronizing circuit, and a circuit is constituted so that the synchronous clock is generated, the clock falling in the center of the data. Recently, the transmission speed of the serial communications interface has become up to hundreds of Mbps to several Gbps, and in order to realize the high-speed and highly reliable communications, the bit synchronizing circuit is required to provide high-performance and high reliability of the communications.

A conventional bit synchronizing circuit 100 used in high-speed serial communications is shown in FIG. 10. A reference clock signal REFCLK and a data input signal SDIN are provided to the bit synchronizing circuit 100. A phase comparison clock generation circuit 110 generates a bit operation clock signal (not shown in FIG. 10) of the frequency corresponding to the transmission speed from the reference clock signal REFCLK, and a total of eight clock signals CLK1-CLK8, each having different phases, are further generated based on the bit operation clock signal.

FIG. 11 is a timing chart of the reference clock signal, the bit operation clock signal, and the clock signals CLK1-CLK8 generated based on the bit operation clock signal. Each of the clock signals CLK1-CLK8 has a phase that is ⅛ cycle shifted in comparison with respective adjacent clock signals. Each of the clock signals CLK1-CLK8 is supplied to an input data edge detection unit 120 and a clock selection unit 140 via a route independent of other clock signals.

The input data edge detection unit 120 detects edge signals EDGE1-EDGE8, as a result of the data input signal SDIN and the clock signals CLK1-CLK8 with different phases being input. The edge signals EDGE1-EDGE8 are supplied to a clock judging (determining) unit 130. In the clock judging unit 130, a clock selection signal CKSL is generated from the edge position recognized based on the edge signals EDGE1-EDGE8. The clock selection signal CKSL and the clock signals CLK1-CLK8 are supplied to the clock selection unit 140.

In the clock selection unit 140, a clock signal for writing WRCK is generated, which is a clock signal for data sampling for a buffer 150 such as an elasticity buffer, based on the clock signals CLK1-CLK8 and the clock selection signal CKSL supplied.

The buffer 150 consists of a multi-bit FIFO or of single bit flip-flops, or many bits, and is for absorbing deviation in the frequency that is arranged beforehand by the transmission and reception sides and clock jitter. Generally in serial communication, an asynchronous FIFO, the width of which is one bit, and depth ranges from several bits to dozens of bits is used. A synchronized data SDOUT is output from the buffer 150, which is read by a circuit of the next stage, and is processed as received data.

FIG. 12 shows a configuration of the input data edge detection unit 120. The input data edge detection unit 120 includes data flip-flops (hereinafter called flip-flop) 121a-121h corresponding to the eight clock signals CLK1-CLK8, respectively, each of which is in a phase different from the others, and exclusive OR (EXOR) gates 122a-122h, quantity of which is the same as the flip-flops 121a-121h. The flip-flops 121a-121h receive the corresponding clock signals CLK1-CLK8, respectively, and the serial data input signal SDIN. Further, each of output signals DFF1-DFF8 from the flip-flops 121a-121h, respectively, is supplied to two EXOR gates. For example, the output of flip-flop 121b is supplied to the EXOR gates 122a and 122b, the output of flip-flop 121c is supplied to the EXOR gates 122c and 122b, and a flip-flop 121h output is supplied to the EXOR gates 122h and 122a.

Each of the EXOR gates 122a-122h outputs a signal (henceforth an edge signal) EDGE12, EDGE23, EDGE34, EDGE45, EDGE56, EDGE67, EDGE78, and EDGE89, respectively, which indicates edge position. An edge signal becomes "HIGH" when the data input signal SDIN changes at the timing of the phase difference of the two clock signals that are input. For example, the signal output from the EXOR gate 122a becomes "HIGH" when a data input signal changes at the timing of the phase difference of CLK1 and CLK2. The edge signals EDGE12-EDGE89 output from the EXOR gates 122a-122h are supplied to the clock judging unit 130 via independent routes.

Here, the number of clock signals having different phases is set at eight, however, the number may be different. Further, edge detection may be performed not by different phases but by a clock signal of a frequency higher than the transmission speed.

FIG. 13 is a timing chart of various signals related to the output timing of the clock signal WRCK for writing to buffer 150. As shown in FIG. 13, the first edge (rising edge) of the data input signal SDIN is located between the edge (rising edge) of the clock signal CLK1 and the edge (rising edge) of CLK2; the second edge (falling edge) of the data input signal SDIN is located between the edge (rising edge) of the clock signal CLK2 and the edge (rising edge) of CLK3; further, the third edge of the data input signal SDIN is located between the edge (rising edge) of the clock signal CLK3 and the edge (rising edge) of CLK4; and, furthermore, the last edge (falling edge) of the data input signal SDIN is located between the edge (rising edge) of the clock signal CLK2 and the edge (rising edge) of CLK3.

If an edge of the data input signal SDIN is detected, the detection pulse of a long period is output as a corresponding edge signal EDGE12-EDGE89. Based on the long detection pulse, CLK1 is output to EDGE12, the phase of CLK1 being about a half cycle late for sampling at the center of the input data. Similarly, CLK2 is output to EDGE23 as a synchronous timing signal, and CLK3 is further output to EDGE34. If there is no transition of edge in the synchronous timing signal and its cycle, the same clock as the previous cycle is output. Finally, the clock signal for writing WRCK to be output to the buffer 150 is generated.

Here, since the configuration after the input data edge detection unit 120, i.e., the operation of the timing of the clock judging unit 130, and the clock selection unit 140 shown in FIG. 12, are publicly known, an explanation thereabout is not presented.

Next, with reference to FIG. 14, a problem that may arise in the conventional bit synchronizing circuit 100 is explained. First, in order that the flip-flops 121*a*-121*h* operate normally, it is necessary to keep input data constant (setup hold) for a predetermined period before and after a clock. If the input data are not held to fixed values during the predetermined period, there is a possibility that output signals DFF1-DFF8 from the flip-flops 121*a*-121*h* become uncertain, i.e., neither 1 nor 0. This phenomenon is called "meta-stability". At the place where mark A" is shown in FIG. 14, the output signal DFF2 from the flip-flop 121*b* should be "HIGH", however, the output signal DFF2 is in the meta-stable state, because the data input signal SDIN changes, and does not fill the setup hold timing requirement of the flip-flop 121*b*. Here, in FIG. 14, an example is shown where the level of the output signal DFF2, which is in the meta-stable state, shifts as the solid bold line indicates.

Further, at the place where mark B" is given in FIG. 14, the output signal DFF6 from the flip-flop 121*f* should be "LOW". However, the output signal DFF6 becomes "HIGH" in the case that the data input to the flip-flop 121*f* delay because of manufacturing problems such as the input resistance of the flip-flop 121*f* for the SDIN being extraordinarily high, there being cross talk in the signal line relative to the flip-flop 121*f*, and timing variation due to manufacturing of the semiconductor device.

When a fault occurs in the output signal of the flip-flops, such as shown by the places marked by A" and B", correct generation of the clock signal for writing to buffer WRCK 150 cannot be attained. Depending on the configuration of the circuit, the signal is not output at the original timing, and a timing error occurs at sampling by the buffer 150, resulting in, e.g., lack of WRCK that causes data dropping, and generation of plural WRCK signals in one cycle that causes retrieving too many bits. With reference to FIG. 14, errors of the synchronous timing signal and the clock signal WRCK occur at the places marked by C" and D", respectively. The errors cause erroneous reception of the serial data.

It is generally known that the meta-stability degrades the reliability of the bit synchronizing circuit, in addition to the problem of variations in the characteristics due to manufacturing, and a fault of a flip-flop used by the edge detection unit in the bit synchronizing circuit, etc. Since the meta-stability causes an erroneous operation, it is required that the meta-stability occurring be prevented, and a bit synchronizing circuit that is meta-stability proof be provided in order to raise the reliability of the circuit.

When a bit synchronizing circuit is built in a semiconductor device, testing of the device is performed by using an LSI tester, wherein a signal that is synchronous to a predetermined timing is input to the device, and a signal output from the device is measured and compared with an expected value. Then, if the output is similar to the expected value, the device passes the test. Otherwise, the device is considered a reject. However, in the case of a bit synchronizing circuit that operates serial data asynchronously at a high speed, a large number of asynchronous input patterns to a system clock have to be prepared on the LSI tester. Further, even if an acceptable device is tested by using the asynchronous input patterns, the receiving data sometimes differs from the expected value in cycles by the input of the asynchronous signal. Furthermore, the difference in data can be subject to variations in manufacturing the semiconductor device. For these reasons, debugging and completing a test program that is capable of accurately selecting acceptable devices from rejects takes a long time. Accordingly, a technology that copes with these problems is wanted.

Conventionally, the following bit synchronizing circuits are known. For example, JPL 7-193562 discloses a totally digital bit synchronizing circuit that is capable of handling high speed communications without using a counter. Although the patented circuit employs a general-purpose clock multilayer circuit or a D flip-flop, as does the present invention, the patented circuit uses only one edge detection unit, resulting in unreliable operations when the flip-flop in the bit synchronizing circuit meets a meta-stable state, which is a cause of faulty operations.

Further, JPL, 9-36849, A discloses a bit synchronizing circuit and a bit synchronous method that realize optimal sampling of input data, the duty rate of which fluctuates, by detecting a rising edge and a falling edge of a signal from a data sampling unit, which is a component of the bit synchronizing circuit, and is for sampling an incoming signal and arranging the sampled signal into an n series of signals, another component thereof being a selection output unit for selecting a signal that is synchronized with a received burst signal out of the sampled n series of the signals. However, since this bit synchronous method uses both edges where a data value changes, there is a problem that the sampling cannot be performed at a high speed. Further, since only one circuit is used for detecting the edges, when the flip-flop of the bit synchronizing circuit comes to a meta-stable state, faulty operations occur, producing a problem of degraded reliability.

Furthermore, JPL, 10-247903, A discloses a bit synchronizing circuit that complies with a high-speed burst signal that is sporadically generated, input timing of which is uncertain, and complies with phase fluctuation without using a high-speed clock that exceeds receiving data speed. However, this circuit uses only one phase comparison circuit, and therefore, lacks reliability.

SUMMARY OF THE INVENTION

Accordingly, it is a general object of the present invention to provide a bit synchronizing circuit that reliably performs at a high transmission speed, and that can easily be tested, which substantially obviates one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by a bit synchronizing circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the bit synchronizing circuit as follows.

The bit synchronizing circuit of the present invention includes a bit synchronizing circuit, a plurality of edge detection units, a clock judging unit, and a clock selection unit, functions and operations of which are described in detail later.

The bit synchronizing circuit of the present invention is provided with a facility for coping with an erroneous edge signal.

Furthermore, the bit-synchronizing circuit of the present invention is provided with a facility to cope with an undesirable situation where a plurality of edge signals are generated by an edge detection unit.

Furthermore, the bit synchronizing circuit of the present invention is provided with a facility that selects a clock signal for writing from the clock signals, using a synchronous timing signal that occurs the latest in time, when the synchronous timing signals generated by the clock judging unit continue in time.

Furthermore, the bit synchronizing circuit of the present invention is provided with a facility to output an error status signal that indicates that a bit synchronizing circuit is in error, when any of the edge signals is in error.

Furthermore, the bit synchronizing circuit of the present invention is provided with a facility for selecting the same timing of the clock signal of the immediately preceding cycle as the clock signal for writing, when the error status signal is generated.

Furthermore, the present invention provides a configuration arrangement of the edge detection unit, such that components therein are arranged symmetrically in view of input terminals for the clock signals and the serial data input signal.

Furthermore, the present invention provides a semiconductor device that contains the bit synchronizing circuit of the present invention, such that, when an error is present in the edge signal generated by the edge detection units, the error status signal is used for testing the bit synchronizing circuit.

DESCRIPTION OF THE PREFERRED EMBODIMENTS

In the following, embodiments of the present invention will be described with reference to the accompanying drawings.

The First Embodiment

Figure 1:
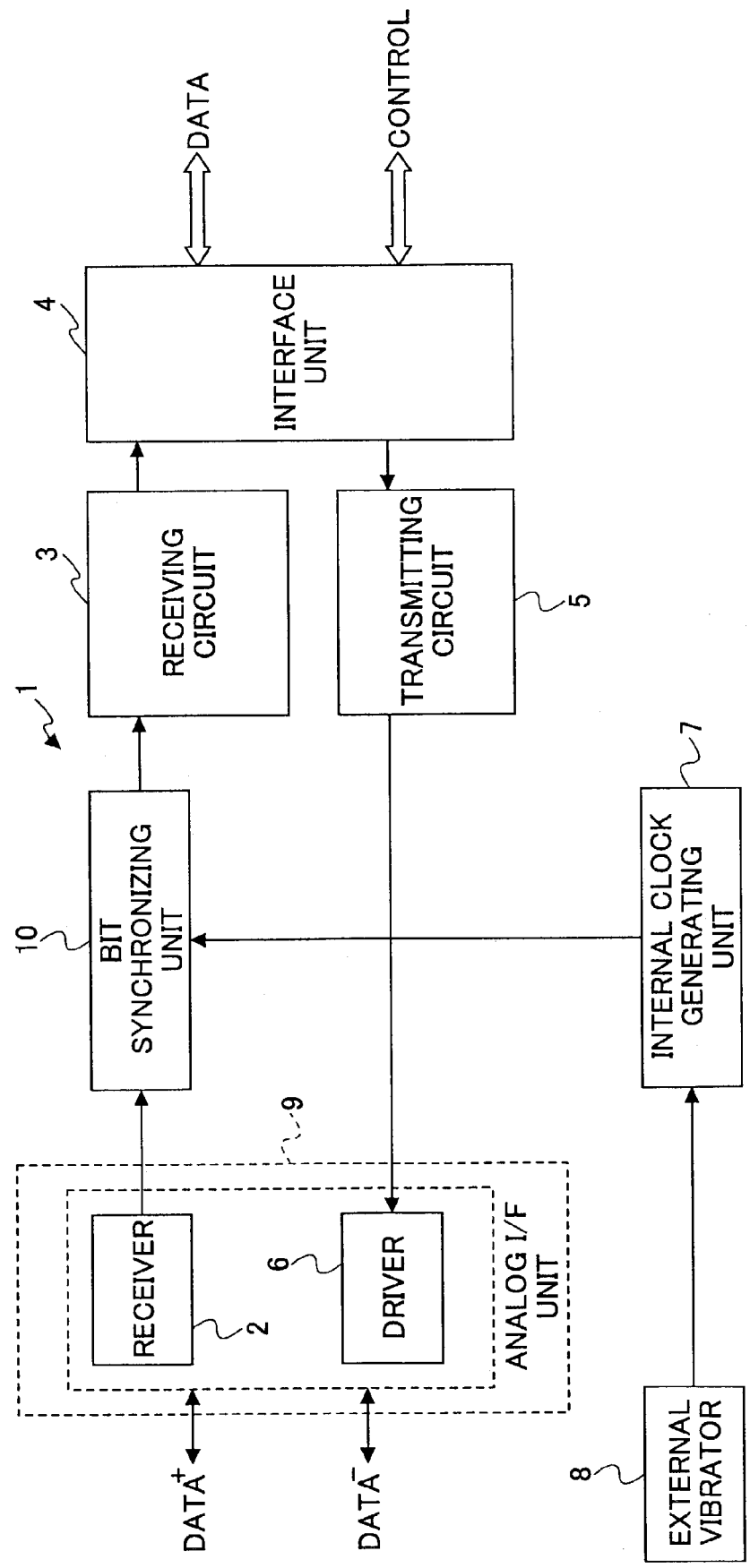
FIG. 1 is a block diagram of a serial transceiver device that includes a bit synchronizing circuit according to an embodiment of the present invention.

FIG. 1 is a block diagram of a serial transceiver device 1 that includes a bit synchronizing circuit 10 according to the embodiment of the present invention. The serial transceiver device 1 is for being used by apparatuses such as computers, communication control units, and terminals; constitutes a physical layer that is one of the protocol layers of the OSI (Open System Interconnection) reference model for interconnecting other apparatuses through a communication circuit; activates, maintains and inactivates physical connections with other apparatuses; and mechanically and electrically controls bit data transmission.

When receiving data, serial data "Data+" (1) and "Data−" (0) are supplied to the bit, synchronizing circuit 10 via a receiver 2 included in an analog I/F unit 9 from the exterior. In the bit synchronizing circuit 10, the serial data provided by the receiver 2 are sampled by a sampling clock (also called a synchronous timing signal) that is generated based on a reference clock REFCLK generated by an internal clock generating unit 7 and an external vibrator 8, and the sampled data are output to a receiving circuit 3 as serial data. In the receiving circuit 3, the serial data are decoded according to a predetermined coding scheme used by the communication. The decoded data are provided to an interface unit 4, where the decoded data are converted to parallel data "DATA" that are output to another part of the device.

Conversely, when transmitting data, parallel data supplied from another part of the device are converted to serial data by the interface unit 4, encoded by a transmitting circuit 5, output to the outside as serial data via a driver 6 included in the analog I/F unit 9.

Figure 2:
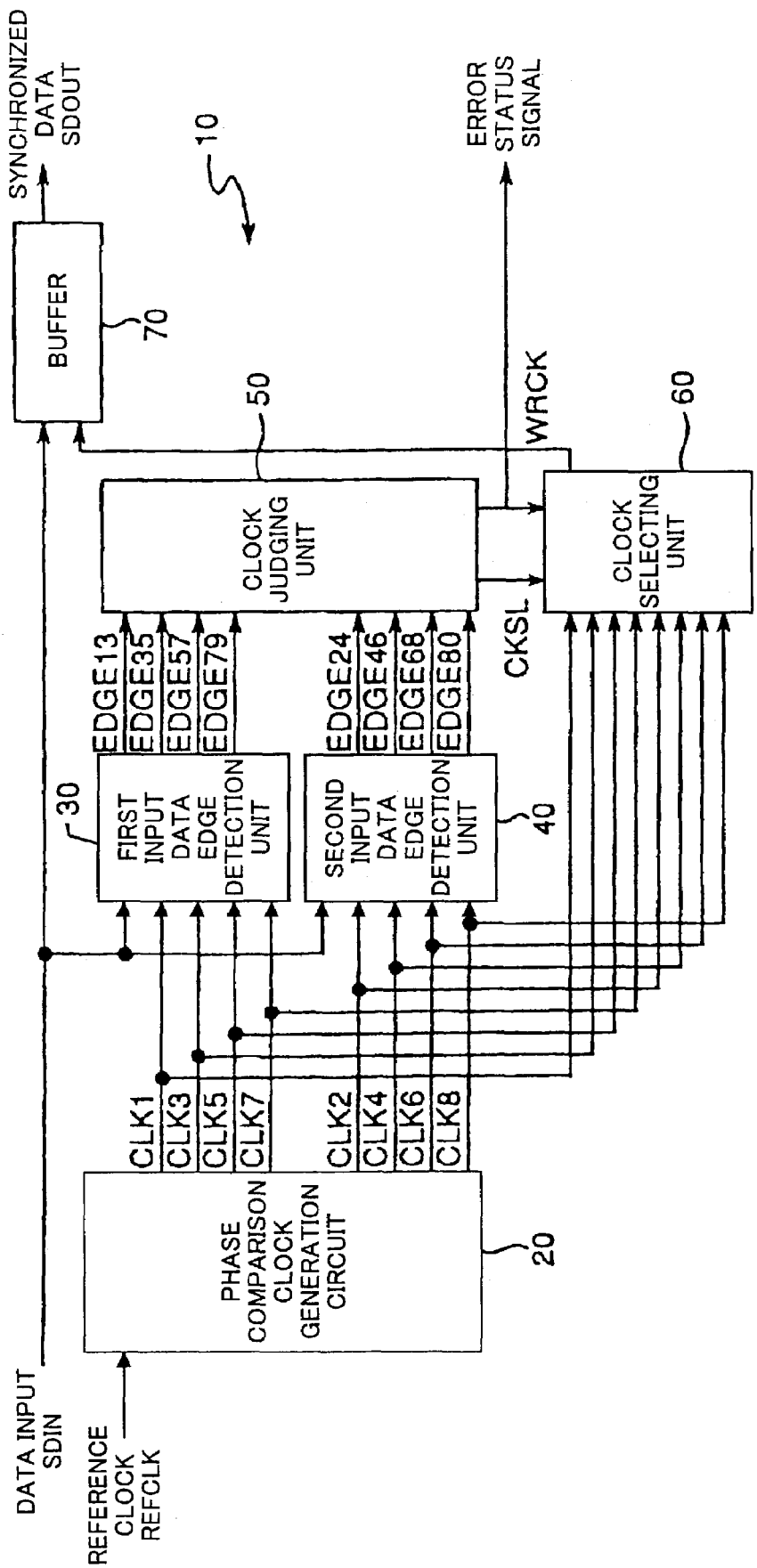
FIG. 2 is a block diagram showing the bit synchronizing circuit of FIG. 1.
Figure 10:
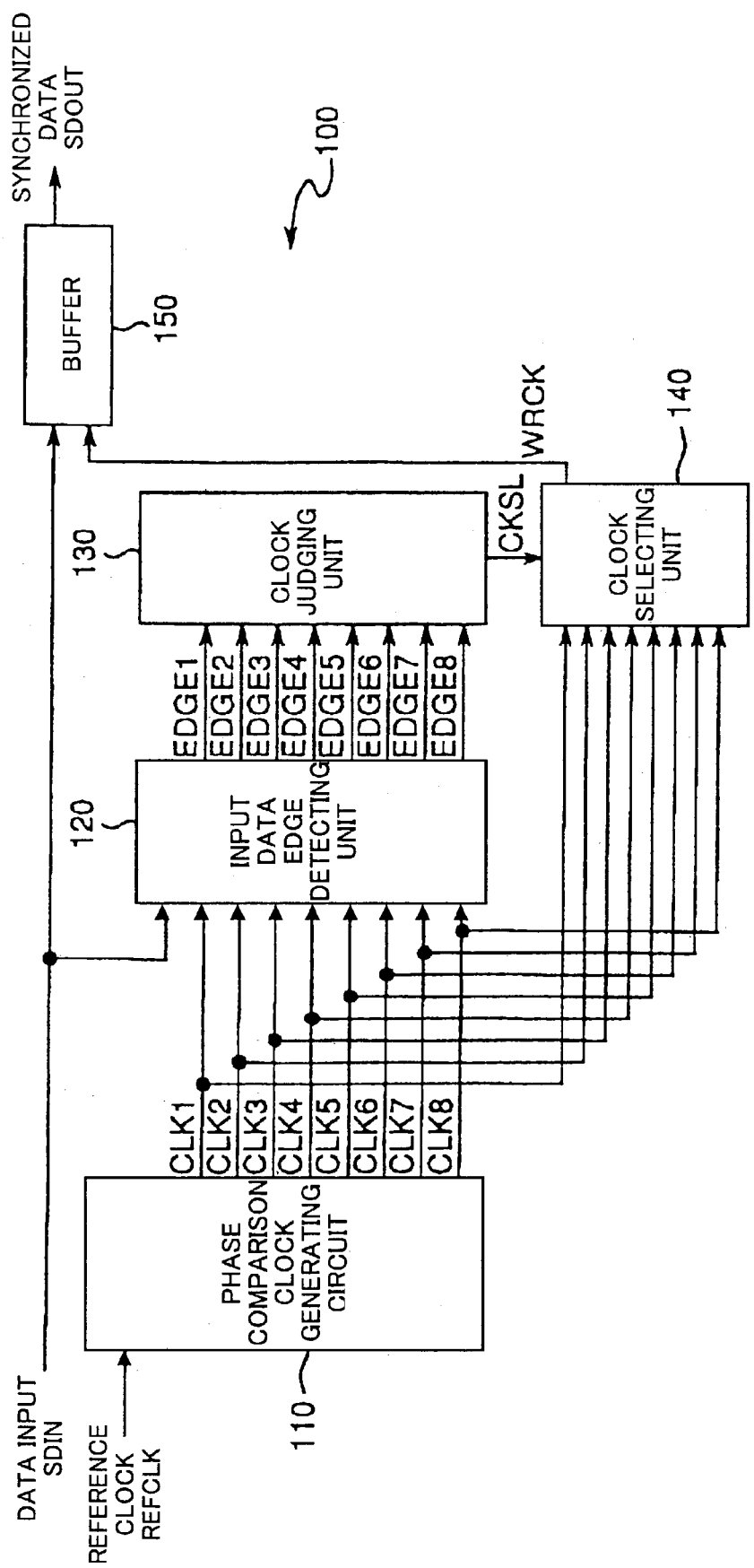
FIG. 10 is a block diagram showing a conventional bit synchronizing circuit.

FIG. 2 shows a configuration of the bit synchronizing circuit 10, which includes a phase comparison clock generation circuit 20, first and second input data edge detection units 30 and 40, respectively, a clock judging unit 50, a clock selection unit 60, and a buffer 70 such as an elasticity buffer. The bit synchronizing circuit 10 outputs serial data synchronized by a synchronous timing signal that is obtained by sampling data input signal SDIN, using the reference clock REFCLK generated by the internal clock generator 7 and the external vibrator 8 (refer to FIG. 1). Although the fundamental configuration and operation of the bit synchronizing circuit 10 are similar the conventional technology as described with reference to FIG. 10, the present invention is characterized by providing a plurality of input data edge detection units (two in the present embodiment, namely, the input data edge detection units 30 and 40) for detecting the edge position of the data input signal SDIN when extracting the synchronous timing signal therefrom, such that the bit synchronizing circuit of the present invention provides a bit synchronizing circuit that is reliable in high-speed operations.

Figure 11:
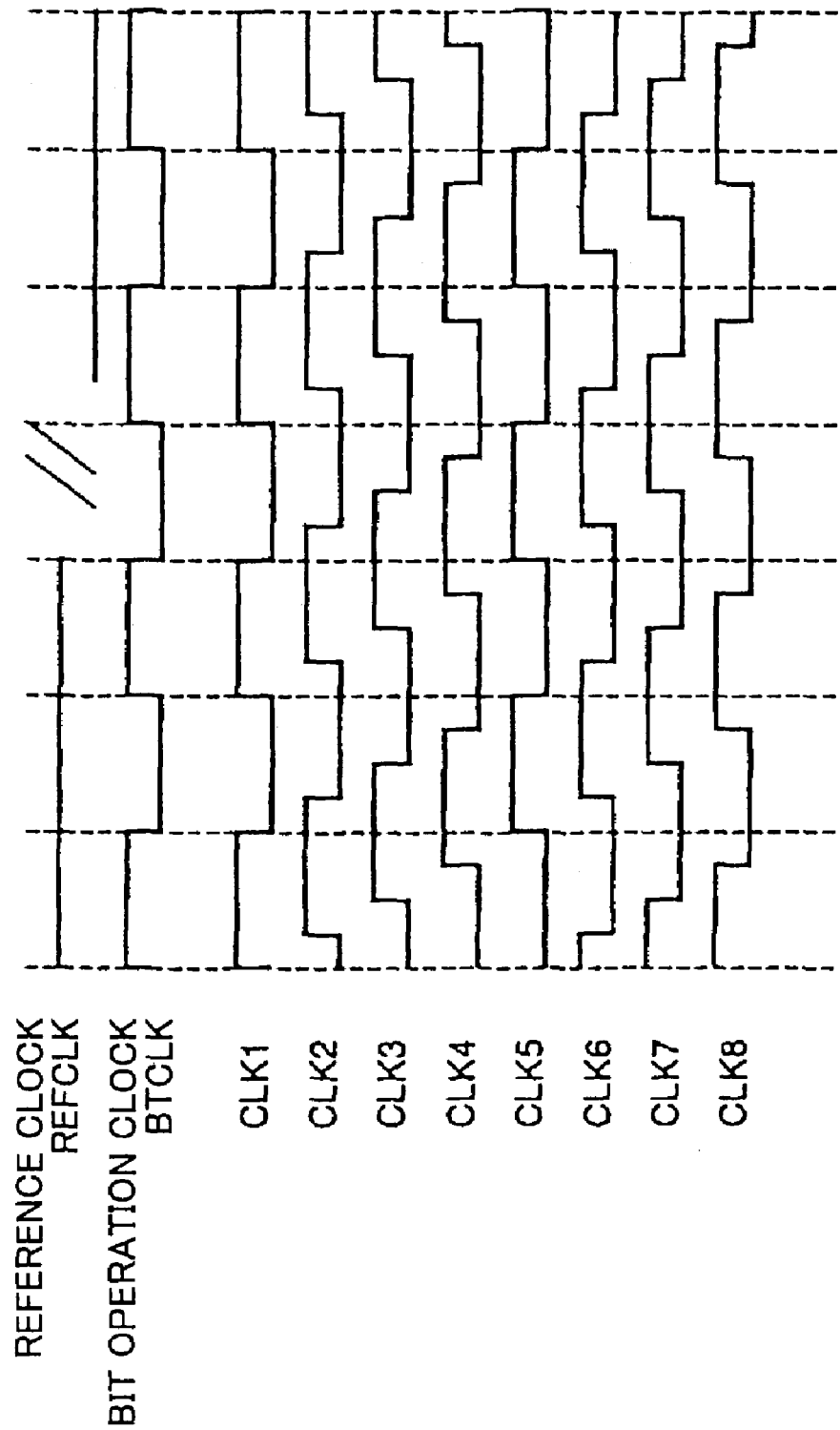
FIG. 11 is a timing chart of various signals related to a phase comparison clock generation circuit included in the conventional bit synchronizing circuit.

In the bit synchronizing circuit 10, the phase comparison clock generation circuit 20 generates a bit operation clock signal having a frequency corresponding to the transmission speed from the reference clock signal REFCLK, and further, a total of eight clock signals CLK1-CLK8, each having a unique phase, are generated based on the bit operation clock signal. Here, the timing chart of the reference clock signal REFCLK, the bit operation clock signal BTCLK, and the clock signals CLK1-CLK8 generated based on the bit operation clock signal is the same as the timing chart of the conventional technology, and each of the clock signals CLK1-CLK8 has a phase that is different by ⅛ of a cycle from adjoining clock signals (refer to FIG. 11).

While these clock signals CLK1-CLK8 are output from the phase comparison clock generation circuit 20 via separate lines, like the conventional technology, the present embodiment is characterized by providing the first and the second input data edge detection units 30 and 40, respectively, and the clock signals CLK1-CLK8 are divided into two groups, one group being output to the edge detection unit 30 and the other group being output to the edge detection unit 40. Here, each group consists of every other clock signals chosen from the clock signals CLK1 to CLK8 that have the ⅛ cycle phase differences each other. More specifically, odd numbered clock signals, namely, CLK1, CLK3, CLK5, and CLK7 are supplied to the first input data edge detection unit 30, and even numbered clock signals, namely, CLK2, CLK4, CLK6, and CLK8 are supplied to the second input data edge detection unit 40.

Figure 3:
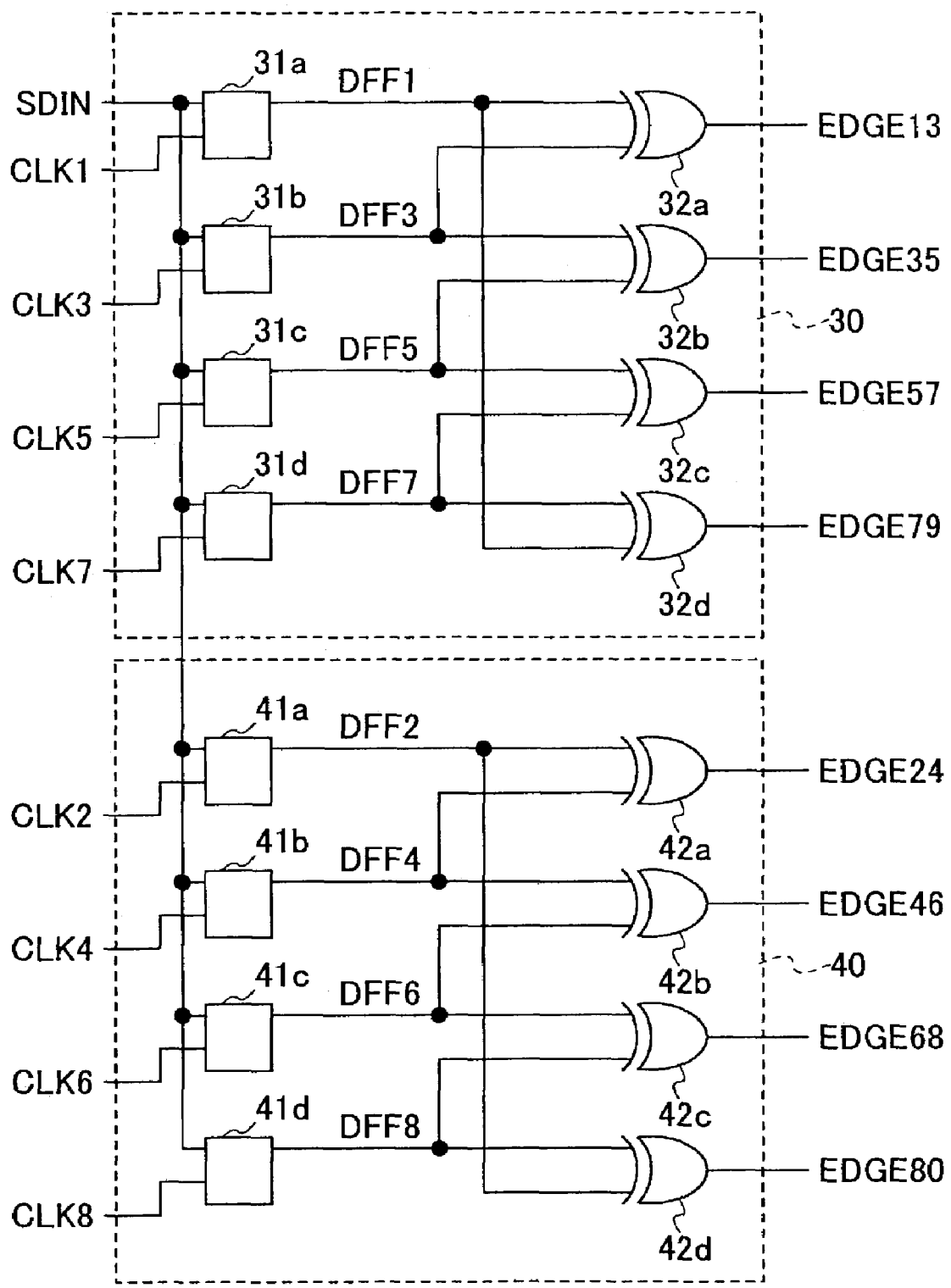
FIG. 3 shows the configuration of an input data edge detection unit included in the bit synchronizing circuit of FIG. 2.

FIG. 3 shows a configuration of the first and the second input data edge detection units 30 and 40. The first input data edge detection unit 30 includes four flip-flops 31a, 31b, 31c, and 31d corresponding to the clock signals CLK1, CLK3, CLK5, and CLK7, respectively, and four EXOR gates 32a, 32b; 32c, and 32d. The data input signal SDIN is supplied to each of the flip-flops 31a-31d along with the corresponding clock signal, and output signals DFF1, DFF3, DFF5, and DFF7 from the flip-flops 31a-31d, respectively, each of the output signals being supplied to two different EXOR gates. More specifically, the output signal DFF1 from the flip-flop 31a is provided to the EXOR gates 32a and 32d; the output signal DFF3 from the flip-flop 31b is provided to the EXOR gates 32a and 32b; the output signal DFF5 from the flip-flop 31c is provided to the EXOR gates 32b and 32c; and the output signal DFF7 from the flip-flop 31d is provided to the EXOR gates 32c and 32d. The first input data edge detection unit 30 outputs one of the edge signals EDGE13, EDGE35, EDGE57, and EDGE79 showing an edge position from the EXOR gates 32a, 32b, 32c, 32d, respectively.

The second input data edge detection unit 40 includes four flip-flops 41a, 41b, 41c, and 41d corresponding to the clock signals CLK2, CLK4, CLK6, and CLK8, respectively, and four EXOR gates 42a, 42b, 42c, and 42d. The data input signal SDIN is supplied to each of the flip-flops 41a-41d along with the corresponding clock signal, like the first input data edge detection unit 30. Output signals DFF2, DFF4, DFF6, and DFF8 from each of the flip-flops 41a-41d, respectively, are supplied to two different EXOR gates, respectively. More specifically, the output signal DFF2 from the flip-flop 41a is provided to the EXOR gates 42a and 42d; the output signal DFF4 from the flip-flop 41b is provided to the EXOR gates 42a and 42b; the output signal DFF6 from the flip-flop 41c is provided to the EXOR gates 42b and 42c; and the output signal DFF8 from the flip-flop 41d is provided to the EXOR gates 42c and 42d. The second input data edge detection unit 40 outputs one of the edge signals EDGE24, EDGE46, EDGE68, and EDGE80 showing an edge position from the EXOR gates 42a, 42b, 42c, and 42d, respectively.

The clock judging unit 50 receives the edge signals sent from the first and the second input data edge detection units 30 and 40, respectively, and generates first and second synchronous timing signals based on the edge signals. The first and the second synchronous timing signals are provided to the clock selection unit 60, and serve as clock selection signals for the clock selection unit 60.

Figure 4:
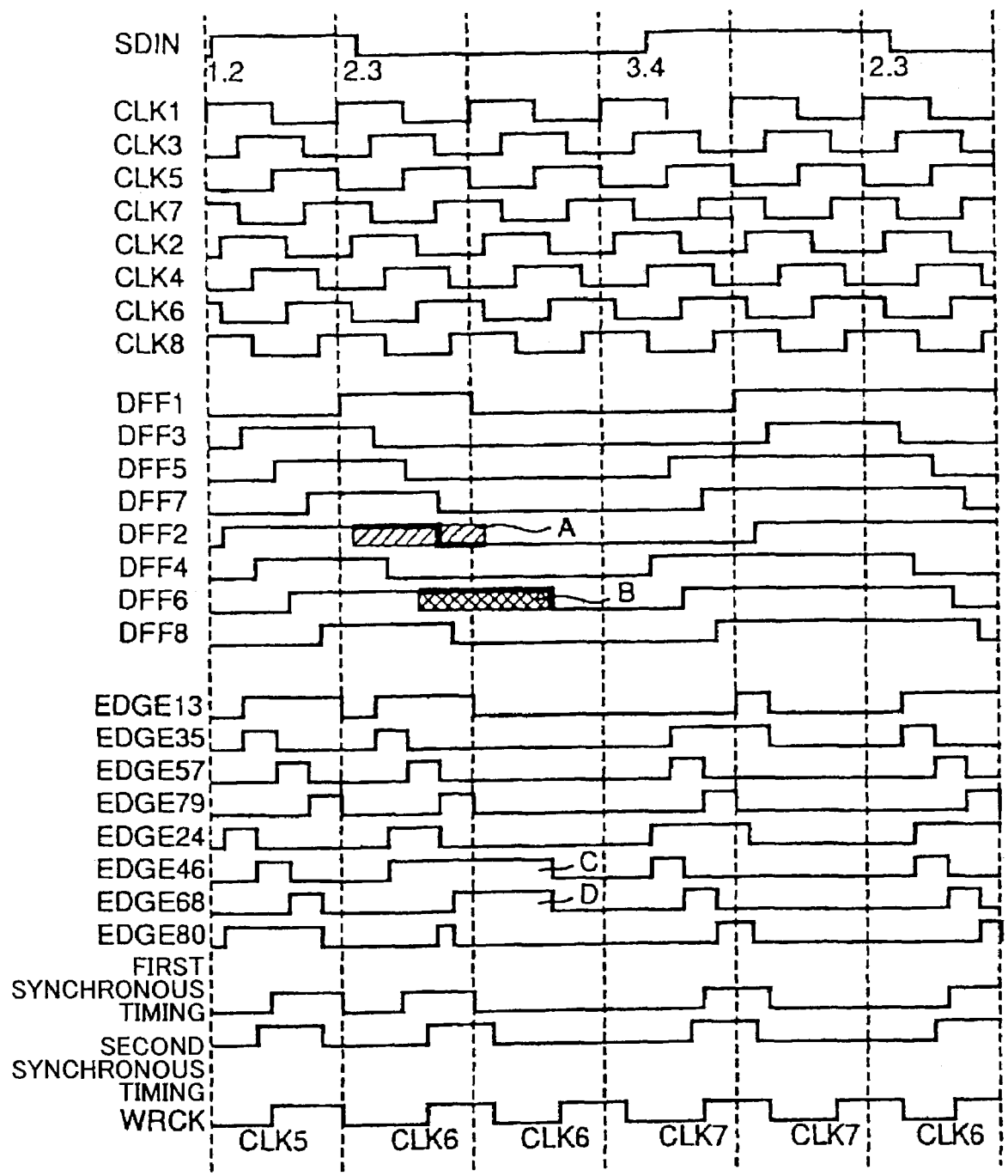
FIG. 4 is a timing chart of various signals of the bit synchronizing circuit of FIG. 2.
Figure 12:
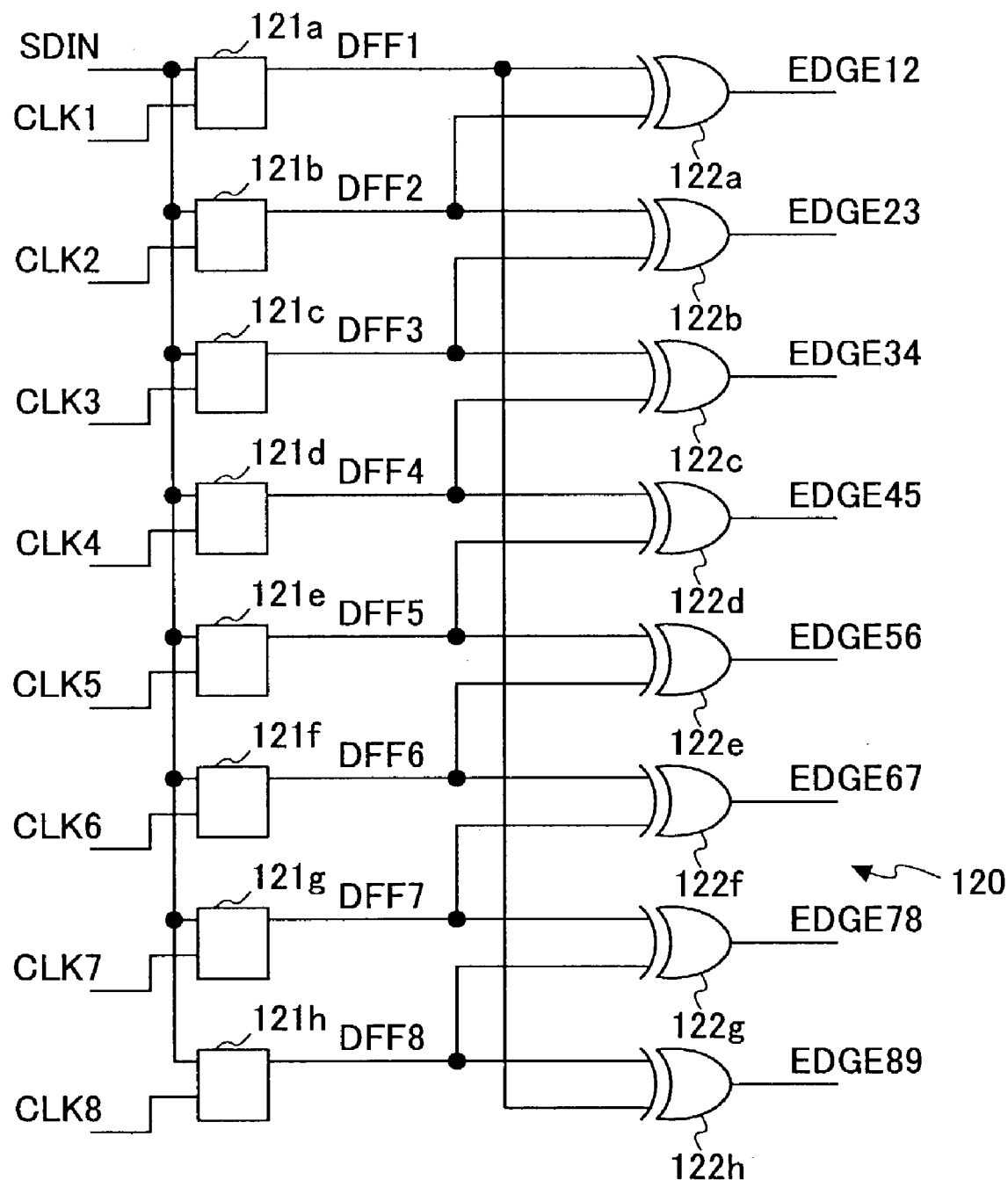
FIG. 12 shows a configuration of an input data edge detection unit contained in the conventional bit synchronizing circuit.
Figure 13:
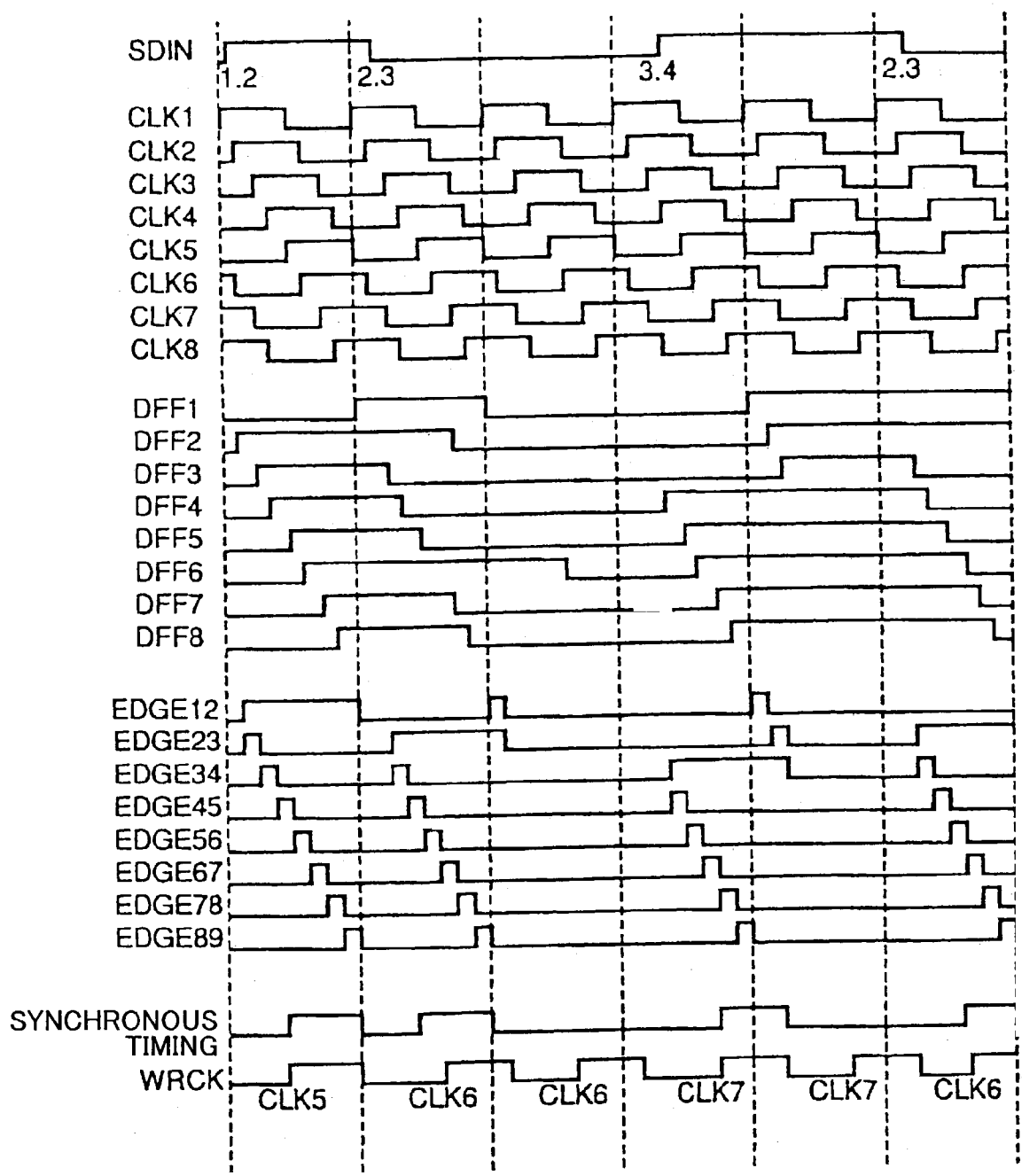
FIG. 13 is a timing chart of the various signals under normal operations relative to the conventional bit synchronizing circuit.
Figure 14:
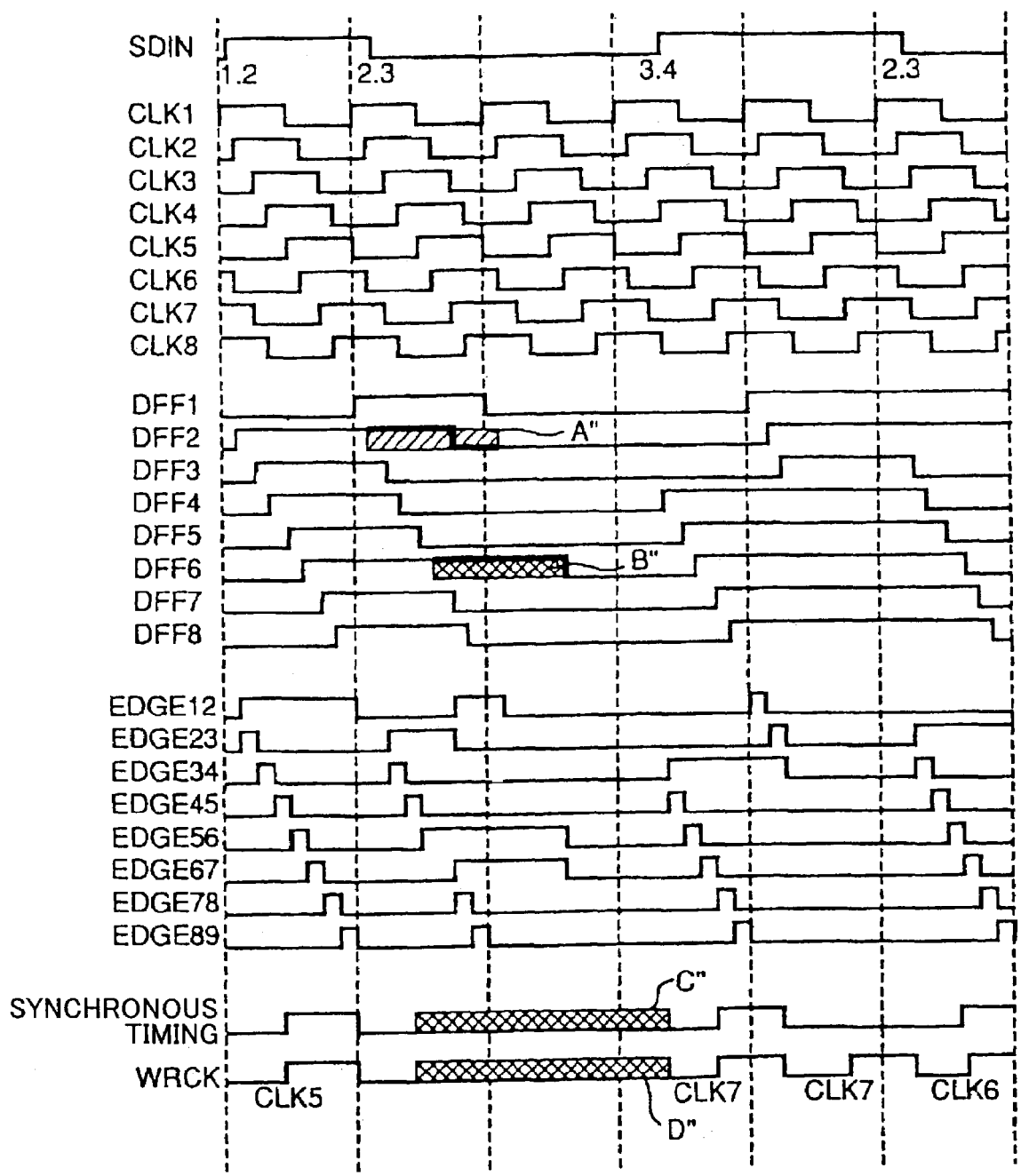
FIG. 14 is a timing chart of the various signals when there is a problem, relative to the conventional bit synchronizing circuit.

Operations of the bit synchronizing circuit 10 are explained with reference to FIG. 4, the operations being under the same conditions as the conventional technology explained with reference to FIG. 12. FIG. 4 is a timing chart of the above-mentioned signals in the bit synchronizing circuit 10. In the bit synchronizing circuit 10, the following algorithms (1) through (4) are employed concerning the synchronous timing signals and the clock signal for writing to buffer WRCK 70 generated from the synchronous timing signals.

(1) When two or more edge signals are output from any one of the input data edge detection units 30 and 40 in a cycle, the synchronous timing signal is not output in the cycle.

(2) When the first and the second synchronous timing signals continue in time, the clock signal WRCK for writing to buffer 70 is output at the timing of the synchronous signal that comes the later.

(3) When the first and the second synchronous timing signals do not continue in time, the same clock signal WRCK for writing as the preceding cycle is output.

(4) When only one of the first and the second synchronous timing signals is generated, the same clock signal WRCK for writing as the preceding cycle is output.

The algorithms (1) and (2) ensure correct output of the clock signal WRCK for writing to buffer, even when there is a situation that would otherwise cause an error such as indicated by the marks "A" and "B" in FIG. 4. Further, when an error of the bit synchronizing circuit 10 is detected, the algorithms (3) and (4) direct an output of the clock signal WRCK for writing that has the same phase as the preceding cycle, which is the safest alternative solution.

Thus, the bit synchronizing circuit 10, which includes the two or more input data edge detection units 30 and 40, generates two or more synchronous timing signals based on the edge signal from each of the edge detection units, and generates the clock signal WRCK for writing based on a correct synchronous timing signal, thereby correct reception of serial data is ensured, and improvement in reliability is realized.

Here, the algorithms (1) through (4) described above are examples of the preferred embodiment, but the present invention is not limited to these. Further, the number of the input data edge detection units is not limited to two, but, for example, three or more input data edge detection units may be provided, and the clock signal WRCK may be generated by a majority decision.

Further, while the bit synchronizing circuit 10 shown in FIG. 2 generates the clock signal for data sampling for the buffer 70 using the two or more synchronous timing signals generated based on the edge signal output by each the first and the second input data edge detection units 30 and 40, a signal that indicates an error status is also generated based on the edge signals from the input data edge detection units. Here, the error status includes the cases where a plurality of edge signals are detected in one cycle by an input data edge detection unit, where the synchronous timing signals of the two input data edge detection units do not continue in time (i.e., do not overlap at all), where there is only one of the first and the second synchronous timing signals being present (i.e., the other synchronous timing signal is missing), and the like. In the bit synchronizing circuit 10, the signal indicating the error status of the bit synchronizing circuit 10 is output from the clock judging unit 50 as an error status signal.

Conventionally, there is a problem that testing of the serial transceiver device 1 is difficult since the bit synchronizing circuit 10 asynchronously operates at a high speed, when the bit synchronizing circuit 10 is built into the serial transceiver device 1, as shown in FIG. 1. Since according to the present invention the error status signal is provided by the clock judging unit 50, the testing becomes possible to all asynchronous patterns by using a program of one kind of an expected value that does not contain an error, facilitating the testing of the serial transceiver device 1.

Further, in the conventional case of detecting an error by using an expected value of receiving data, the error cannot be detected until data reception is completed. By the present invention, the error status signal of the bit synchronizing circuit becomes available during reception of serial data, thereby an error can be detected earlier than in the conventional case where the error is detected after completing the data reception. In this manner, screening of-rejects is carried out quicker when a semiconductor device is tested.

Figure 5:
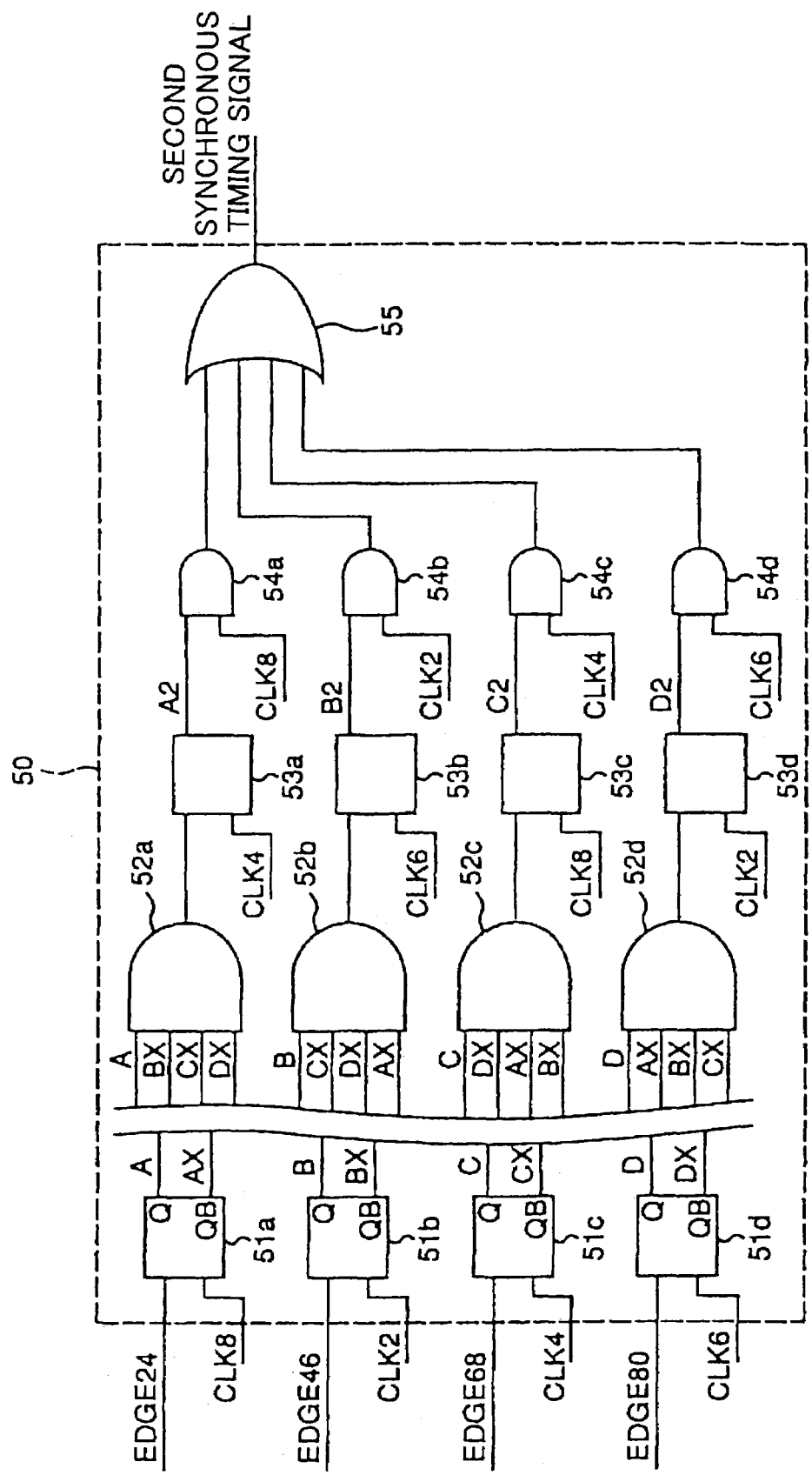
FIG. 5 shows the configuration of a clock judging unit included in the bit synchronizing circuit of FIG. 2.
Figure 6:
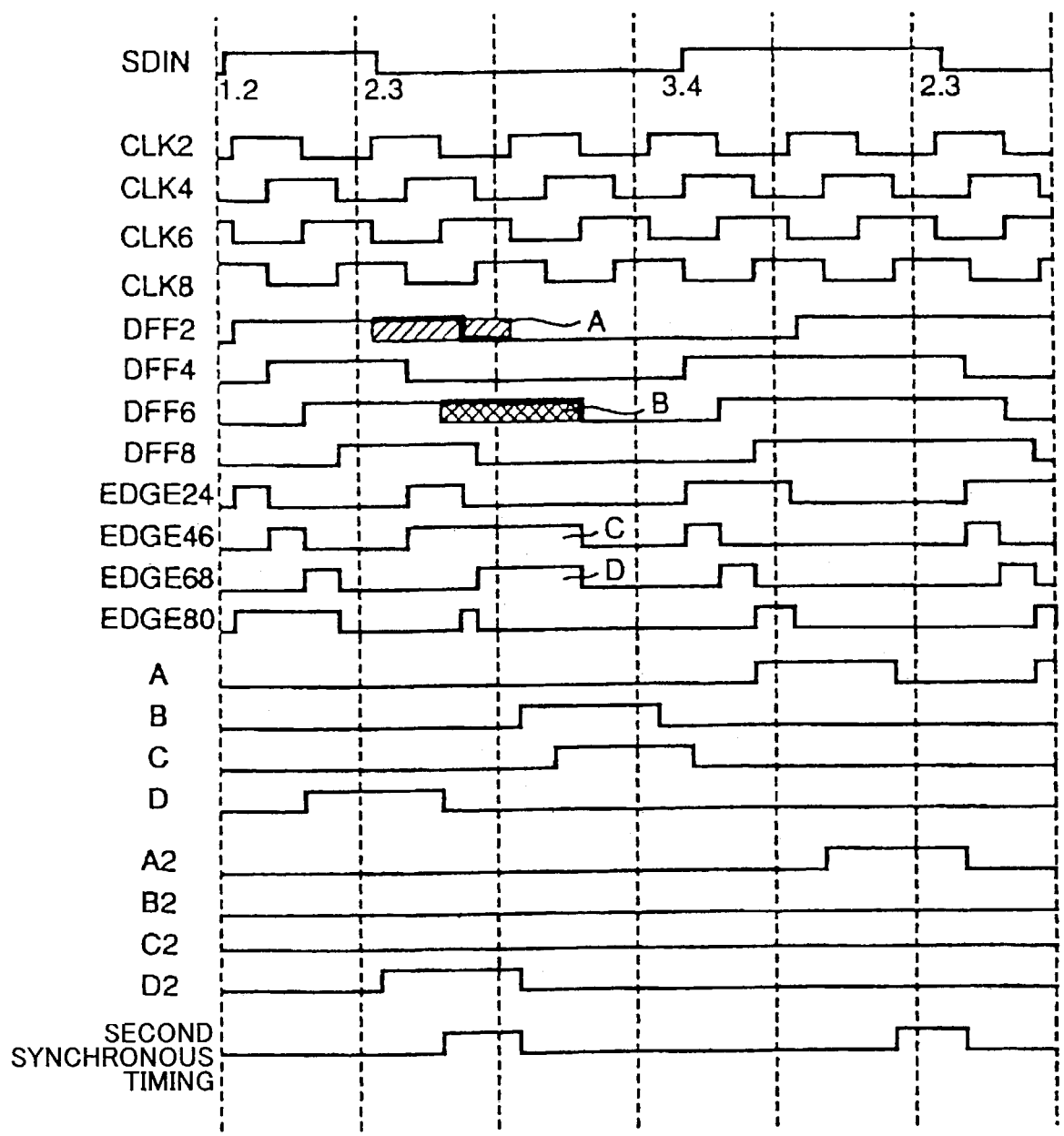
FIG. 6 is the timing chart of various signals related to the clock selection part of FIG. 2.

FIG. 5 shows a detailed configuration of a circuit contained in the clock judging unit 50, the circuit corresponding to the second input data edge detection unit 40. Further, the timing chart of various signals related to this configuration is shown by FIG. 6. Reference marks given to the signal waveforms shown in FIG. 6 also correspond to the signals shown in FIG. 5. Although it is not shown in FIG. 2 that shows the overall bit synchronizing circuit 10 configuration, a clock signal from the phase comparison clock generation circuit 20 is supplied to the clock judging unit 50 with the edge signals from the first and the second input data edge detection units 30 and 40. The clock judging unit 50 includes flip-flops 51a, 51b, 51c, and 51d, AND gates 52a, 52b, 52c, and 52d, flip-flops 53a, 53b, 53c, and 53d, AND gates 54a, 54b, 54c, and 54d and an OR gate 55. The clock judging unit 50 generates the second synchronous timing signal based on the clock signals CLK2, CLK4, CLK6, and CLK8 from the phase comparison clock generation circuit 20, and the edge signals EDGE24, EDGE46, EDGE68, and EDGE80 from the second input data edge detection unit 40.

Although a drawing is not provided, the clock judging unit 50 includes another circuit that corresponds to the first input data edge detection unit 30, the circuit being similar to the above-mentioned circuit corresponding to the second input data edge detection unit 40. The circuit corresponding to the first input data edge detection unit 30 generates the first synchronous timing signal based on the clock signals CLK1, CLK3, CLK5, and CLK7 from the phase comparison clock generation circuit 20, and the edge signals EDGE13, EDGE35, EDGE57, and EDGE79 from the first input data edge detection unit 30.

Next, another embodiment (the second embodiment) of the present invention is explained. Here, the same reference mark is given to the same matter as the first embodiment, and explanation thereof is not repeated.

The Second Embodiments

Figure 7:
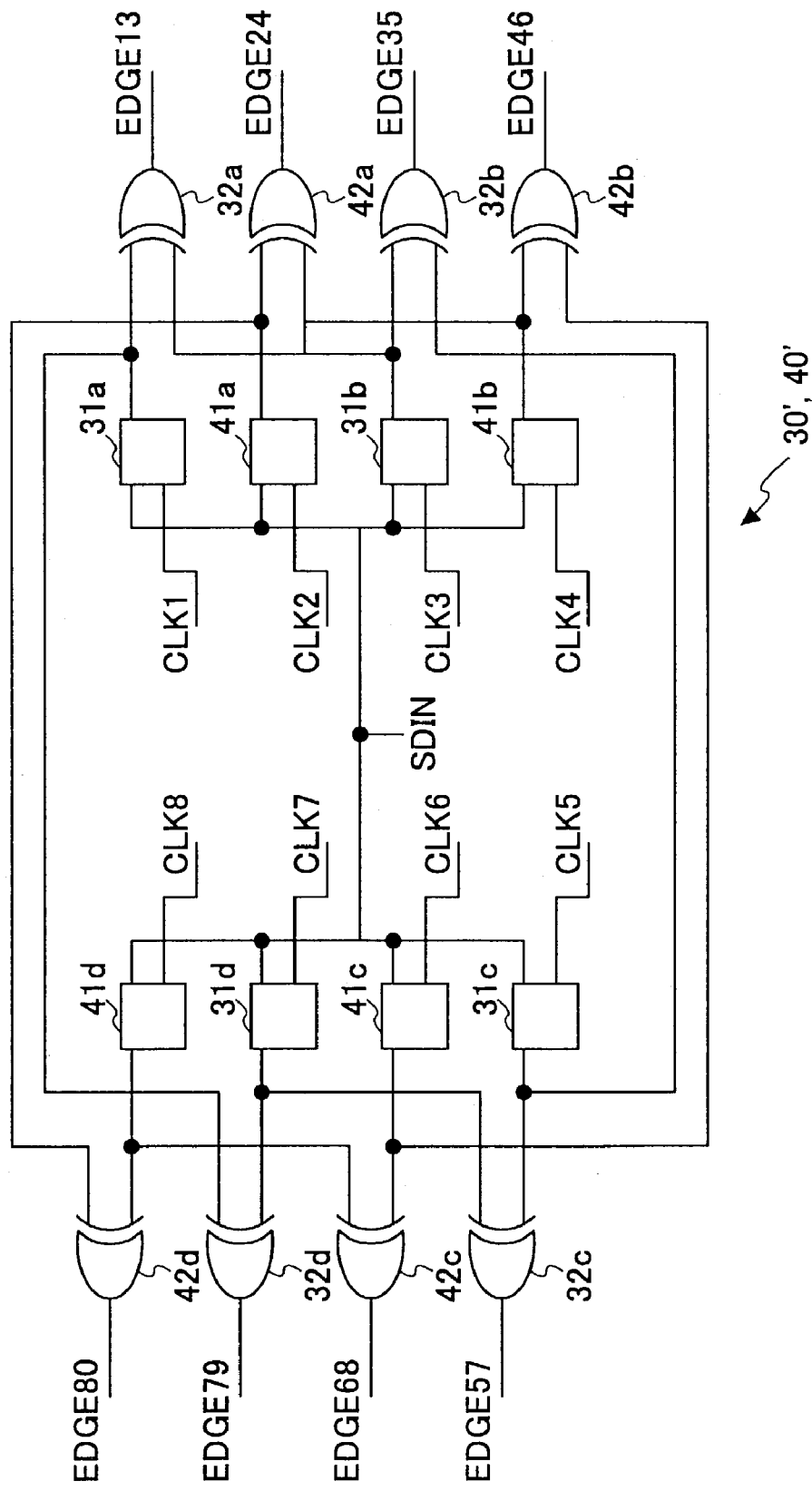
FIG. 7 shows a configuration of the input data edge detection unit according to the second embodiment of the present invention.

FIG. 7 shows an arrangement of each component of input data edge detection units 30' and 40' according to the second embodiment of the present invention. Usually, as mentioned above, when detecting an edge signal, a flip-flop should operate as intended by design. For this purpose, exact input timing of the data input signal SDIN and the clock signals CLK1-CLK8 to the flip-flop is especially important. Here, circuits of the first and the second input data edge detection units 30' and 40' are substantially equal to the circuits of the input data edge detection units 30 and 40 shown in FIG. 3, respectively. Specifically, each of the input data edge detection units 30' and 40' includes the flip-flops 31a-31d, the EXOR gates 32a-32d, the flip-flops 41a-41d, and the EXOR gates 42a-42d. However, the second embodiment is characterized by the components (flip-flops and XOR gates) being line symmetrically arranged in view of terminals for the clock signals CLK1-CLK8 and the data input signal SDIN, when installed in the serial transceiver device 1, such that all the flip-flops approximately simultaneously receive the clock signal and the data input signal, and, for this reason, the flip-flops operate at almost uniform timing.

The Third Embodiment

Figure 8:
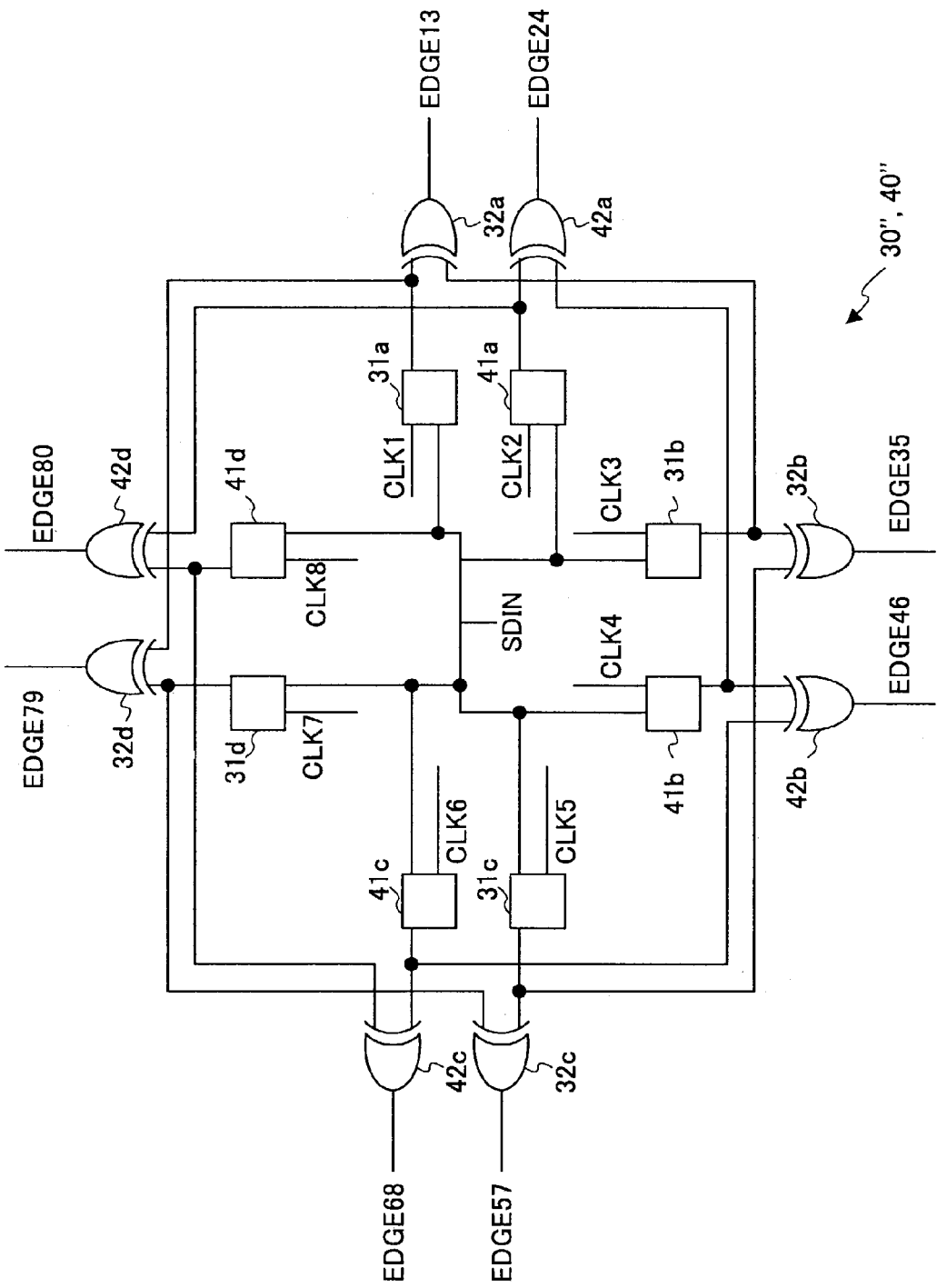
FIG. 8 shows a configuration of the input data edge detection unit according to the third embodiment of the present invention.

FIG. 8 shows an arrangement of the components of the input data edge detection unit according to the third embodiment of the present invention. In contrast to the second embodiment where the components (especially flip-flops) of the first and the second input data edge detection units are arranged in line-symmetry to the input terminals for the clock signals and the data input signal, the third embodiment is characterized by a point-symmetry arrangement of the components. That is, the components of first and second input data edge detection units 30" and 40" are arranged along four edges, namely left, right, up and bottom edges, further improving exactness of signal input timing.

By arranging the components of the input data edge detection unit in line-symmetry and point-symmetry to the input terminals for the signals, as performed in the second and the third embodiments, respectively, exact timing of the signal input is realized, and the reliability of the operations of the bit synchronizing circuit is enhanced.

The Fourth Embodiments

Figure 9:
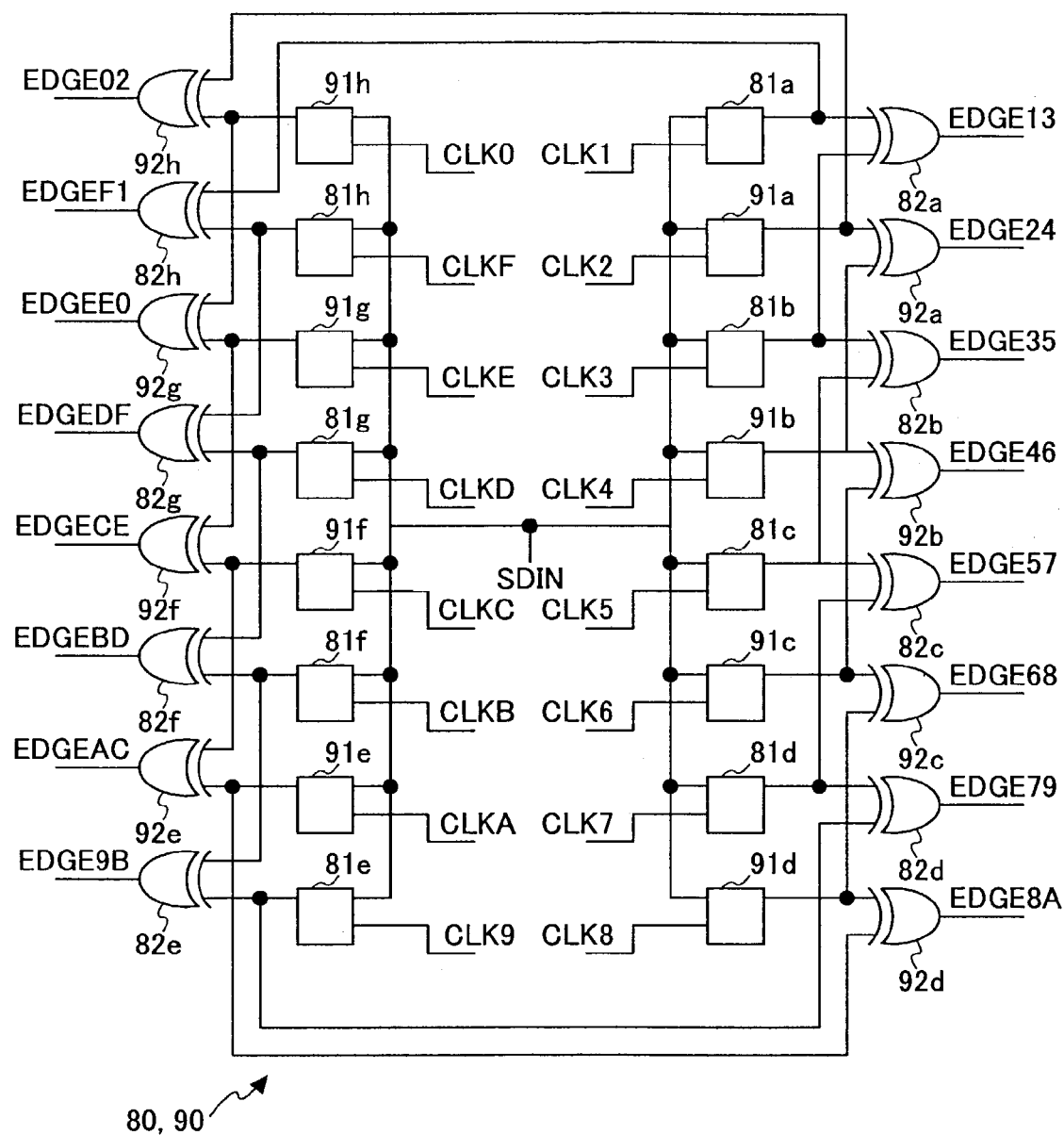
FIG. 9 shows a configuration of the input data edge detection unit according to the fourth embodiment of the present invention.

FIG. 9 shows an arrangement of the components of input data edge detection units 80 and 90 according to the fourth embodiment of the present invention. The fourth embodiment includes a plurality of the input data edge detection units, as is the case with the previous embodiments, namely, the first and the second input data edge detection units 80 and 90, respectively. However, each of the input data edge detection units 80 and 90 includes eight flip-flops 81a-81h, eight flip-flops 91a-91h, eight EXOR gates 82a-82h and eight EXOR gate 92a-92h. Furthermore, the components are arranged in line-symmetry to the terminals of the data input-signal SDIN and clock signals CLK0-CLKF.

When the first and the second input data edge detection units 80 and 90, respectively, are used in a bit synchronizing circuit, a phase comparison clock generation circuit (not shown) is required to generate the clock signals CLK0-CLKF, each having a phase difference of 1/16 cycle from adjoining clock signals.

Each of the input data edge detection units of the fourth embodiment includes eight flip-flops and eight EXORs, and clock signals have a phase difference that is finer than the previous embodiments, thereby the detection of an edge signal can be performed at a higher resolution. Further, in the fourth embodiment, the components of the input data edge detection unit are arranged symmetrically in view of the input terminals of the signals, thereby the signal input is carried out in exact timing like the second and the third embodiment, and can enhance the operation reliability of the bit synchronizing circuit.

Further, the present invention is not limited to these embodiments, but various variations and modifications may be made without departing from the scope of the present invention. For example, the number of flip-flops and EXOR gates of an input data edge detection unit is not limited to four and eight, but 16 flip-flops and 16 EXOR gates, e.g., may be employed.

As described above, the present invention realizes highly reliable operations of the bit synchronizing circuit, since a plurality of edge detection units are provided, and the writing clock signal is generated, while checking operations of the edge detection units, the writing clock signal being suitable for a clock signal for synchronizing serial data based on the edge signal output by each of the edge detection units.

Further, the present invention realizes highly reliable operations of the bit synchronizing circuit, since the clock selection unit selects the clock signal for writing instead of using a synchronous timing signal generated by the clock judging unit when any one of the edge signals generated by the edge detection units is abnormal.

Further, the present invention realizes highly reliable operations of the bit synchronizing circuit, since the clock judging unit does not output the synchronous timing signal to the clock selection unit in a cycle where at least one of the edge detection units generates a plurality of edge signals in the cycle.

Further, the present invention realizes highly reliable operations of the bit synchronizing circuit, since the clock signal for writing is chosen using the synchronous timing signal of which edge detection position is the latest of the synchronous timing signals when the synchronous timing signals generated by the clock judging units continue in time.

Furthermore, according to the present invention, an abnormality of the bit synchronizing circuit is easily detected, since the error status signal that indicates the bit synchronizing circuit being in error is output when the clock judging unit determines that an abnormality is present in an edge signal generated by any one of the edge detection units.

Further, the present invention realizes highly reliable operations of the bit synchronizing circuit, since the clock selection unit selects the clock signal for writing in the same timing as in the preceding cycle, when the error status signal that indicates that the bit synchronizing circuit is in error is output, thereby the probability of correct data sampling is, raised, even when synchronization by the bit synchronizing circuit is not successful.

Further, the present invention realizes highly reliable operations of the bit synchronizing circuit, since the components included in the edge detection units are arranged symmetrically in view of the input terminals for the clock signals, each of which having a phase difference from adjacent clock signals, and the serial data input signal.

Furthermore, the present invention facilitates testing of a device that includes the bit synchronizing circuit operating asynchronously at a high speed, since when an abnormality is present in an edge signal generated by any one of the edge detection units, the abnormality is not detected from received data, but from the error status signal output by the clock judging unit, indicating that the bit synchronizing circuit is in error.

The present application is based on Japanese priority application No. 2002-081437 filed on Mar. 22, 2002 with the Japanese Patent Office, the entire contents of which are hereby incorporated by reference.

What is claimed is:

1. A bit synchronizing circuit that synchronizes serial data by a clock signal when transmitting bit data, comprising:
a phase comparison clock generation unit for generating a plurality of clock signals based on a predetermined reference clock signal, each of the clock signals having a unique phase different from other clock signals,
a plurality of edge detection units, each unit being for generating an edge signal that indicates an edge position of the serial data, wherein each of the detection units is supplied with a group of the clock signals, the group of the clock signals consisting of every predetermined number of the clock signals generated by the phase comparison clock generation unit,
a clock judging unit for generating a synchronous timing signal based on the edge signal generated by each of the edge detection units, and
a clock selection unit for selecting a clock signal for writing that is suitable for a clock signal for synchronizing the serial data, the selection being made from the clock signals, each of which is in a different phase, based on the synchronous timing signal generated by the clock judging unit,
wherein, when the clock selection unit detects an abnormality in any one of the edge signals generated by the edge detection units, said selected clock signal for writing is re-selected, instead of the synchronous timing signal generated by the clock judging unit relative to the abnormal edge signal.

2. The bit synchronizing circuit as claimed in claim 1, wherein components comprising the edge detection unit are arranged symmetrically in view of input terminals for the clock signals that have phases different from each other, and the serial data input signal.

3. The bit synchronizing circuit as claimed in claim 1, wherein the clock selection unit generates the clock signal for writing having the same timing as an immediately preceding clock signal for writing, when the error status signal that indicates that the bit synchronizing circuit is in error is generated.

4. A bit synchronizing circuit that synchronizes serial data by a clock signal when transmitting bit data, comprising:
a phase comparison clock generation unit for generating a plurality of clock signals based on a predetermined reference clock signal, each of the clock signals having a unique phase different from other clock signals,
a plurality of edge detection units, each unit being for generating an edge signal that indicates an edge position of the serial data, wherein each of the detection units is supplied with a group of the clock signals, the group of the clock signals consisting of every predetermined number of the clock signals generated by the phase comparison clock generation unit, a clock judging unit for generating a synchronous timing signal based on the edge signal generated by each of the edge detection units, and a clock selection unit for selecting a clock signal for writing that is suitable for a clock signal for synchronizing the serial data, the selection being made from the clock signals, each of which is in a different phase, based on the synchronous timing signal generated by the clock judging unit, wherein the clock judging unit suspends output of the synchronous timing signal to the clock selection unit in a cycle when two or more edge signals are generated by any one of the edge detection units in the cycle.

5. The bit synchronizing circuit as claimed in claim 4, wherein components comprising the edge detection unit are arranged symmetrically in view of input terminals for the clock signals that have phases different from each other, and the serial data input signal.

6. The bit synchronizing circuit as claimed in claim 4, wherein the clock selection unit generates the clock signal for writing having the same timing as an immediately preceding clock signal for writing, when the error status signal that indicates that the bit synchronizing circuit is in error is generated.

7. A bit synchronizing circuit that synchronizes serial data by a clock signal when transmitting bit data, comprising:

a phase comparison clock generation unit for generating a plurality of clock signals based on a predetermined reference clock signal, each of the clock signals having a unique phase different from other clock signals, a plurality of edge detection units, each unit being for generating an edge signal that indicates an edge position of the serial data, wherein each of the detection units is supplied with a group of the clock signals, the group of the clock signals consisting of every predetermined number of the clock signals generated by the phase comparison clock generation unit, a clock judging unit for generating a synchronous timing signal based on the edge signal generated by each of the edge detection units, and a clock selection unit for selecting a clock signal for writing that is suitable for a clock signal for synchronizing the serial data, the selection being made from the clock signals, each of which is in a different phase, based on the synchronous timing signal generated by the clock judging unit, wherein, when the synchronous timing signals generated by the clock judging unit continue in time, a synchronous timing signal representing an edge detection position, which comes the latest in time among the synchronous timing signals that continue in time, is selected as the clock signal for writing.

8. The bit synchronizing circuit as claimed in claim 7, wherein components comprising the edge detection unit are arranged symmetrically in view of input terminals for the clock signals that have phases different from each other, and the serial data input signal.

9. The bit synchronizing circuit as claimed in claim 7, wherein the clock selection unit generates the clock signal for writing having the same timing as an immediately preceding clock signal for writing, when the error status signal that indicates that the bit synchronizing circuit is in error is generated.

10. A bit synchronizing circuit that synchronizes serial data by a clock signal when transmitting bit data, comprising:

a phase comparison clock generation unit for generating a plurality of clock signals based on a predetermined reference clock signal, each of the clock signals having a unique phase different from other clock signals, a plurality of edge detection units, each unit being for generating an edge signal that indicates an edge position of the serial data, wherein each of the detection units is supplied with a group of the clock signals, the group of the clock signals consisting of every predetermined number of the clock signals generated by the phase comparison clock generation unit, a clock judging unit for generating a synchronous timing signal based on the edge signal generated by each of the edge detection units, and a clock selection unit for selecting a clock signal for writing that is suitable for a clock signal for synchronizing the serial data, the selection being made from the clock signals, each of which is in a different phase, based on the synchronous timing signal generated by the clock judging unit, wherein the clock judging unit generates an error status signal that indicates that a bit synchronizing circuit is in error, when an edge signal generated by any one of the edge detection units is abnormal.

11. The bit synchronizing circuit as claimed in claim 10, wherein the clock selection unit generates the clock signal for writing having the same timing as an immediately preceding clock signal for writing, when the error status signal that indicates that the bit synchronizing circuit is in error is generated.

12. The bit synchronizing circuit as claimed in claim 10, wherein components comprising the edge detection unit are arranged symmetrically in view of input terminals for the clock signals that have phases different from each other, and the serial data input signal.

13. A semiconductor device comprising the bit synchronizing circuit as claimed in claim 10, wherein testing of the bit synchronizing circuit can be performed by using the error status signal output by the clock judging unit.

* * * * *